(12) United States Patent
Villeneuve et al.

(10) Patent No.: US 10,730,256 B2
(45) Date of Patent: Aug. 4, 2020

(54) MOLD FOR VULCANIZING A TIRE

(71) Applicant: Compagnie Generale des Etablissements Michelin, Clermont-Ferrand (FR)

(72) Inventors: Bernard Villeneuve, Clermont-Ferrand (FR); David Dean, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/470,142

(22) PCT Filed: Dec. 8, 2017

(86) PCT No.: PCT/FR2017/053461
§ 371 (c)(1),
(2) Date: Jun. 14, 2019

(87) PCT Pub. No.: WO2018/109331
PCT Pub. Date: Jun. 21, 2018

(65) Prior Publication Data
US 2019/0389163 A1 Dec. 26, 2019

(30) Foreign Application Priority Data
Dec. 16, 2016 (FR) .................................... 16 62628

(51) Int. Cl.
*B29D 30/06* (2006.01)
*B60C 15/024* (2006.01)

(52) U.S. Cl.
CPC .... *B29D 30/0606* (2013.01); *B29D 2030/062* (2013.01); *B29D 2030/0612* (2013.01); *B60C 15/0242* (2013.01)

(58) Field of Classification Search
CPC .......... B29D 30/0606; B29D 2030/062; B29D 2030/0612; B60C 15/023; B60C 15/0242
(Continued)

(56) References Cited

U.S. PATENT DOCUMENTS 2,092,813 A * 9/1937 Oakleaf .................. B29C 33/60
264/338
3,204,681 A 9/1965 Olagnier et al.
(Continued)

FOREIGN PATENT DOCUMENTS

EP 3103609 A 12/2016
JP 2005-144901 A 6/2005

OTHER PUBLICATIONS

International Search Report dated Feb. 22, 2018, in corresponding PCT/FR2017/053461 (6 pages).

*Primary Examiner* — James P Mackey
(74) *Attorney, Agent, or Firm* — Venable LLP

(57) ABSTRACT

A tire (20) comprises a sidewall (21) and an attachment bead (23) extending the said sidewall (21) and designed to be attached to a rim of a wheel of a motor vehicle. A mould (10) for vulcanizing a tire comprises a lateral part (12) designed to mould the sidewall (21) of the tire and a lower part 13 designed to mould the attachment bead (23). The lateral part 12 and the lower part 13 at least partially delimit a tire receiving space (E) designed to receive the tire that is to be vulcanized in the mould (10). The mould comprises a slot (16) extending the tire receiving space (E) and the slot (16) is at least partially moulded by the lower part 13 of the mould (10).

8 Claims, 5 Drawing Sheets

(58) Field of Classification Search
USPC .......................................................... 425/36
See application file for complete search history.

(56) References Cited

U.S. PATENT DOCUMENTS

| | | | | |
|---|---|---|---|---|
| 3,467,988 | A * | 9/1969 | Zaffaroni | ........... B29D 30/0662 |
| | | | | 425/36 |
| 4,624,899 | A | 11/1986 | Macaigne et al. | |
| 6,402,489 | B1 * | 6/2002 | Dyer | .................. B29D 30/0606 |
| | | | | 425/28.1 |
| 6,402,490 | B1 * | 6/2002 | Menard | .............. B29D 30/0602 |
| | | | | 425/36 |
| 6,830,722 | B2 * | 12/2004 | Matsunaga | ........ B29D 30/0606 |
| | | | | 264/325 |
| 9,211,658 | B2 * | 12/2015 | Price Lewis | ............ B29C 33/56 |
| 10,414,109 | B2 * | 9/2019 | Oshima | ................... B29C 33/42 |
| 2002/0185204 | A1 | 12/2002 | Matsunaga | |
| 2016/0221285 | A1 | 8/2016 | Villeneuve | |
| 2017/0008243 | A1 | 1/2017 | Oshima | |

\* cited by examiner

MOLD FOR VULCANIZING A TIRE

FIELD OF THE INVENTION

The present invention relates to a mould for moulding and vulcanizing a tyre. More specifically, the mould comprises a hollow part for moulding a wall of rubber intended to extend from the sidewall of the tyre, near the bead for attachment to the rim.

PRIOR ART

A motor vehicle tyre comprising a protuberance on one sidewall is known from document US 2002/0185204. This protuberance, also referred to as a bead protector, is positioned on the tyre near the attachment bead that serves to attach the tyre to a rim of a motor vehicle. The protuberance affords this bead protection against mechanical attack, such as knocks against kerbs, or kerbing.

In order to mould this bead protector onto a tyre, this tyre is placed in a mould in a suitable tyre-receiving space. The bead protector is moulded by a cavity of the mould, which is trapezoidal overall, extending the tyre receiving space. In order to have a bead protector that is rigid enough, the cavity makes an angle greater than 45° with a radial direction of the mould, and the width of this cavity decreases with increasing distance away from the tyre receiving space.

Now, it is has been found that the air flow, during running, is disturbed near the bead for attachment to the rim. These disturbances increase the rolling resistance of the tyre and the fuel consumption of the motor vehicle is increased as a result. The air flow is disturbed even more when the tyre comprises a bead protector.

There is therefore a need to propose a simple and economical mould suited to moulding a solution that makes it possible to improve the air flow over the sidewall of a tyre.

Defintions

A "tyre" means all types of resilient tread, whether or not it is subjected to an internal pressure.

In a tyre, a "rubber" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

An "angle" made by a slot in a mould or respectively made by a rubber wall of a tyre, with a given direction, means the angle measured between the main direction of this slot or, respectively, the wall of rubber, and this given direction (in a view in cross section). This angle is measured starting from the slot, or respectively starting from the wall of rubber, towards the given direction, in the clockwise direction.

What is meant by the "main direction" of the slot in a view in cross section is the direction in which the slot exhibits the greatest dimension in this cross-sectional view.

What is meant by the "radial direction" in a mould is a direction passing through the centre of the mould and oriented towards the mould part that is designed to mould the tread of the tyre.

What is meant by the "radial direction" in a tyre is a direction passing through the centre of the tyre and oriented towards the tread of this tyre.

The "tread" of a tyre means a quantity of rubbery material delimited by lateral surfaces and by two main surfaces, one of which is intended to come into contact with a road surface when the tyre is being driven on.

The "sidewall" of a tyre means a lateral surface of the said tyre, which surface is positioned between the tread and a bead for attachment to the rim.

A "bead for attachment to the rim" means that part of the tyre that is designed to connect the tyre to the rim of a wheel of a motor vehicle. The bead for attachment to the rim forms an outgrowth or bulge at the end of the sidewall of the tyre. This bead for attachment to the rim comprises a metal bead wire extending circumferentially in the tyre.

SUMMARY OF THE INVENTION

The invention relates to a mould for vulcanizing a tyre, the said tyre comprising a sidewall and an attachment bead extending the said sidewall and designed to be attached to a rim of a wheel of a motor vehicle. The mould comprises a lateral part designed to mould the sidewall of the tyre and a lower part designed to mould the attachment bead. The lateral part and the lower part at least partially delimit a tyre receiving space designed to receive the tyre that is to be vulcanized in the mould. The mould comprises a slot extending the tyre receiving space and the slot is at least partially moulded by the lower part of the mould.

In order to improve the air flow near the attachment bead of the tyre, provision is made for the sidewall of the tyre to be provided with a thin wall of rubber. This wall of rubber extends along the circumference of this sidewall. It is furthermore formed integrally with the said sidewall and a fully or partially covers the bead for attachment to the rim. The wall of rubber is moulded in the mould using a slot. When viewed from the outside of the tyre, the wall of rubber acts like a barrier, limiting the flow of air near the bead for attachment to the rim. The air thus flows mainly along the wall of rubber over an external face of this wall of rubber. The disturbances in the air flow are thus less significant and the vehicle consumption is improved.

In one nonlimiting embodiment, viewed in cross section, the slot makes an angle less than or equal to 30°, in terms of absolute value, with a radial direction of the mould.

In another nonlimiting embodiment, the angle is less than or equal to 15°.

In another nonlimiting embodiment, the slot extends parallel to the radial direction.

In another nonlimiting embodiment, the length of the slot is greater than or equal to 5 times the width of the said slot.

In another nonlimiting embodiment, the width of the slot is less than or equal to 10 mm, and preferably less than or equal to 2 mm.

In another nonlimiting embodiment, the tyre receiving space comprises a junction part joining the slot with the rest of the receiving space, the width of the said junction part reducing progressively from the receiving space towards the slot.

In another nonlimiting embodiment, the slot is delimited by two different mould parts.

In another nonlimiting embodiment, the slot is covered with a non-stick coating.

BRIEF DESCRIPTION OF THE DRAWINGS

Further features and advantages of the invention will become apparent from the following description, given by way of non-limiting example, with reference to the attached drawings in which.

DETAILED DESCRIPTION

In the following description, elements which are substantially identical or similar will be denoted by identical references.

Figure 7:
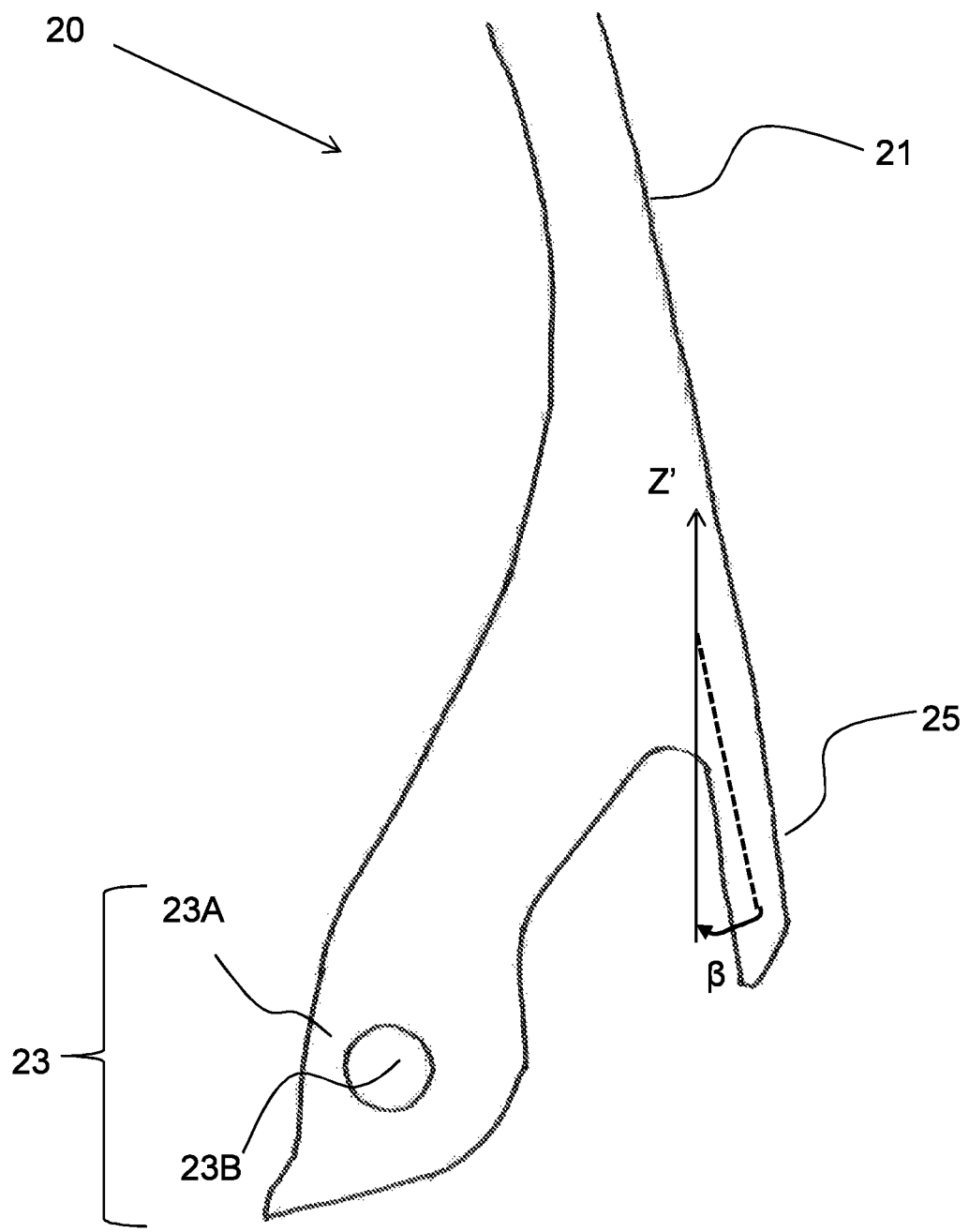
FIG. 7 partially depicts a tyre comprising a wall of rubber moulded by a mould according to the invention.

FIG. 7 partially depicts a tyre 20 moulded with a mould that forms the subject of the invention. This tyre 20 comprises a tread (not illustrated in FIG. 7), a sidewall 21 and an attachment bead 23. The tread is intended to come into contact with a roadway when the tyre 20 is running. The tread is extended laterally by the sidewall 21. This sidewall 21 takes the form of a lateral surface positioned between the tread and the attachment bead 23. The sidewall 21 bears markings (not depicted) intended to provide technical and legal information regarding the quality of the tyre and/or intended to allow the consumer to discern the make and origin of the product. The attachment bead 23 comprises a rubber bulge 23A and a metal bead wire 23B. The rubber bulge 23A and the metal bead wire 23B encourage attachment of the tyre to a rim (not depicted) of a wheel of a motor vehicle.

The tyre of FIG. 7 also comprises a wall of rubber 25. The wall of rubber 25 is of the same composition as the sidewall 21. In one nonlimiting alternative form of embodiment, the wall of rubber 25 is made from a different material from that of the sidewall 21.

When viewed in cross section, the wall of rubber 25 begins from the sidewall and extends towards the attachment bead 23, forming an angle beta β with a radial direction Z' of the tyre. This angle β is less than 30° with the radial direction Z'.

The wall of rubber 25 extends circumferentially along the sidewall 21 of the tyre 20 so as to form a barrier to deflect the air flow and prevent this flow of air from reaching the attachment bead 23. This then reduces the rolling resistance of the tyre 20 during the running of this tyre.

FIGS. 1 to 6 schematically depict a mould 10 designed to mould a wall of rubber on a tyre.

The mould comprises several parts 11, 12, 13. These parts are designed to move relative to one another between a mould-open position and a position in which the said mould is closed. In the mould-open position it is possible to place the tyre that is to be vulcanized (referred to as a green tyre) into the mould or it is possible to remove the vulcanized tyre (referred to as a cured tyre) from the mould. In the position in which the mould is closed, the tyre is enclosed in the mould where it will be vulcanized.

The mould 10 thus comprises:
an upper part 11 designed to mould the tread of a tyre;
a lateral part 12 designed to mould a sidewall of the tyre;
a lower part 13 designed to mould a bead of the tyre;
a slot 16.

Upper Part 11:

The upper part 11 of the mould is designed to mould the tread of the tyre 20.

The upper part 11 of the mould thus comprises the negative of the tread pattern present on the tread of the tyre 20. More specifically, the upper part 11 of the mould comprises a set of protuberances and of recesses which are designed to mould voids (grooves and/or sipes) into the tread of the tyre 20.

In one preferred embodiment which has not been depicted, the upper part 11 of the mould comprises several parts. The dynamics of these various parts are determined in such a way that when the mould is brought towards its open position, the various parts move away from each other. Conversely, when the mould is brought towards its closed position, the various parts move closer together.

Lateral Part 12:

The lateral part 12 of the mould is designed to mould the sidewall 21 of the tyre. More specifically, the lateral part 12 of the mould comprises a first S1 moulding surface S1. This first moulding surface S1 extends between the points A and B visible in FIGS. 1 to 6. The point A corresponds to an intersection between the lateral part 12 of the mould and the upper part 11 of the mould. The point B corresponds to an intersection between the lateral part 12 of the mould and the lower part 13 of the said mould. The first moulding surface S1 is designed to mould the external surface of the sidewall 21 of the tyre 20. It extends between the points A and B visible in FIGS. 1 to 6. This first moulding surface S1 comprises a negative of the markings present on the sidewall 21 of the tyre. More specifically, the first moulding surface S1 comprises a collection of recesses and of bosses designed to mould the said markings on the external surface of the sidewall 21 of the tyre. In one preferred embodiment, this collection of recesses and of bosses is borne by an insert securely mounted in the lateral part 12 of the mould.

In one preferred embodiment, the mould comprises two lateral mould parts. Each of these lateral mould parts is intended to mould a respective sidewall of the tyre. The dynamics of these two lateral mould parts are determined in such a way that when the mould is brought towards its open position, the two lateral parts of the mould move away from each other. Conversely, when the mould is brought towards its closed position, the two lateral parts of the mould move closer together.

Lower Part 13:

The lower part 13 of the mould is a mould part designed specifically to mould the attachment bead 23 of the tyre 20. This lower part 13 of the mould is borne by the lateral mould part 12. It therefore follows the same dynamics as this lateral mould part 12. The lower part 13 comprises a second moulding surface S2, a moulding finger 15 and a slot 16.

The second moulding surface S2 is designed to mould an external surface of the attachment bead 23 of the tyre 20. The second S2 moulding surface S2 extends between the points C and D visible in FIGS. 1 to 6. This surface S2 is borne by a moulding finger 15. This moulding finger 15 partially delimits a slot 16. This slot 16 is open to the inside of the mould 11. It notably extends a tyre receiving space E designed to receive a tyre that is to be vulcanized in the mould 10. The slot is designed to mould a wall of rubber 25 of a tyre 20.

Internal Membrane:

The mould 10 comprises an internal membrane 14. This internal membrane 14 is designed to adopt an expanded position and a rest position. In the expanded position, the internal membrane 14 occupies a maximum volume in the mould. In this expanded position, the internal membrane 14 defines, with the first moulding surface S1 of the lateral part 12 of the mould and with the second moulding surface S2 of the lower part 13 of the mould, a tyre receiving space E. This receiving space E is designed to receive a tyre that is to be vulcanized in the mould 10. More specifically, when the internal membrane 14 is in the expanded position, the said internal membrane 14 presses the green tyre against the upper part 11 of the mould, against the lateral part 12 of the mould and against the lower part 13 of the mould. The tread pattern on the tread of the tyre 20 is then moulded by the upper part 11. Likewise, the markings on the sidewall 21 of the tyre are moulded by the lateral mould part 12. The moulding of the tread patterns and the markings can be achieved by heating the mould 10 to a very high temperature (of the order of 150° C.) for around ten minutes. In a preferred embodiment, the mould 10 is heated using superheated water and steam. Under the effect of the heat, the rubber present in the green tyre flows into the gaps in the mould 10. The slot 16 fills with material to form the wall of rubber 25 on the cured tyre, this slot 16 extending the tyre receiving space E in the mould. Once the vulcanizing operation is over, the internal membrane 14 retracts to adopt its rest position to make it easier to extract the cured tyre 20 from the mould. The transition of the internal membrane 14 from the rest position to the expanded position is rendered possible by circulating a fluid in this internal membrane 14.

Slot:

As already specified, the mould 10 comprises a slot 16 designed to mould a wall of rubber 25 of a tyre 20. This slot 16 takes the form of an extension of the receiving space E of the mould 10. Viewed in cross section, the slot 16 is a hollow space of rectangular overall shape. It extends from the point B to the point C and extends circumferentially in the mould 10.

In one nonlimiting embodiment, the slot 16 makes an angle $\alpha$ less than or equal to 30°, in terms of absolute value, with a radial direction Z. This slot 16 has a main direction U in its length L, and the angle $\alpha$ is measured between this main direction U and the radial direction Z, in the clockwise direction. With such an angle $\alpha$, the wall of rubber 25 moulded by the slot 16 makes a limited angle $\beta$ on the tyre 20. Thus, when the tyre 20 is running, the air flow will act on the wall of rubber 25 in such a way as to move this wall of rubber 25 closer to the attachment bead 23. The protection of the attachment bead 23 by the wall of rubber 25, namely the fact of limiting the air flow directly on this attachment bead, is thus dynamically improved during running.

In one nonlimiting alternative form of embodiment, the angle $\alpha$ of the slot 16 is less than or equal to 15°. The extent to which the wall of rubber 25 moves closer towards the attachment bead 23 during the running of the tyre 20 is improved still further.

Figure 1:
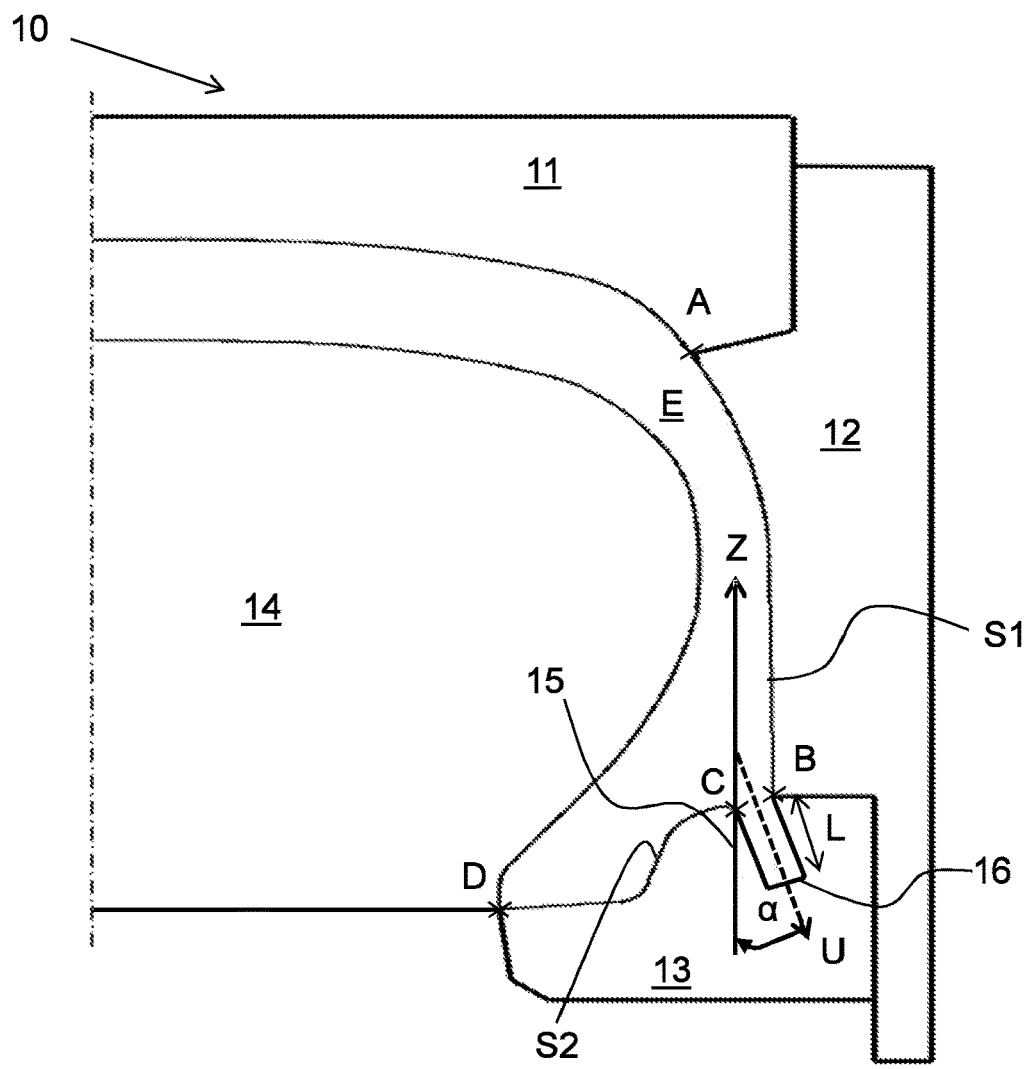
FIG. 1 schematically depicts a cross-sectional view of the mould of the invention according to a first nonlimiting embodiment, in which the slot which extends the tyre receiving space in the mould is oblique with respect to the circumferential direction Z.
Figure 2:
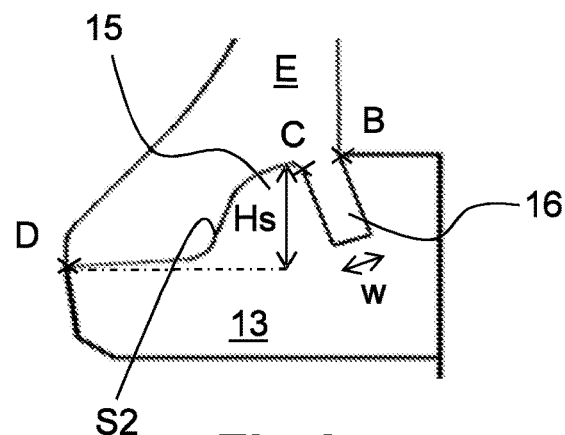
FIG. 2 is an enlarged view of the mould of FIG. 1, centred on the said slot.
Figure 3:
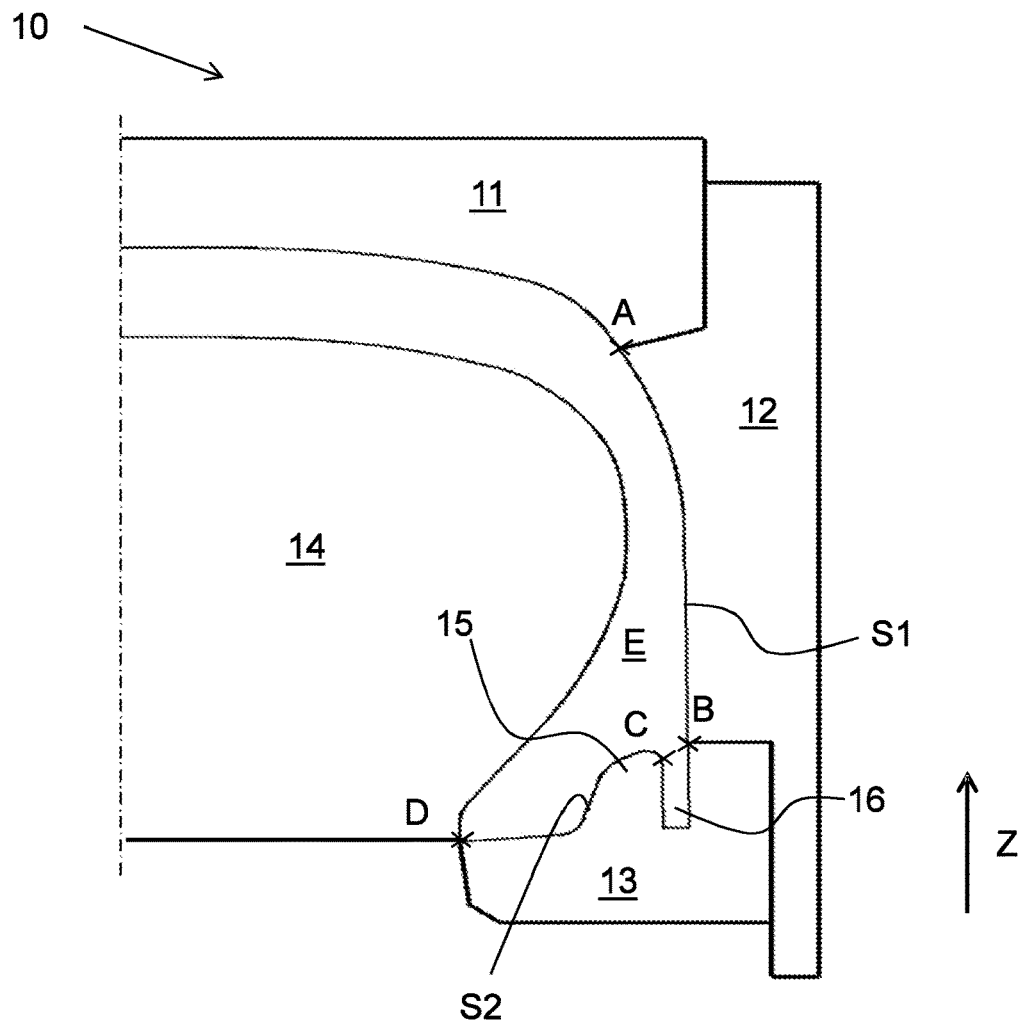
FIG. 3 schematically depicts a cross-sectional view of the mould of the invention according to a second nonlimiting embodiment, in which the slot has a main direction oriented in a radial direction in the mould.
Figure 4:
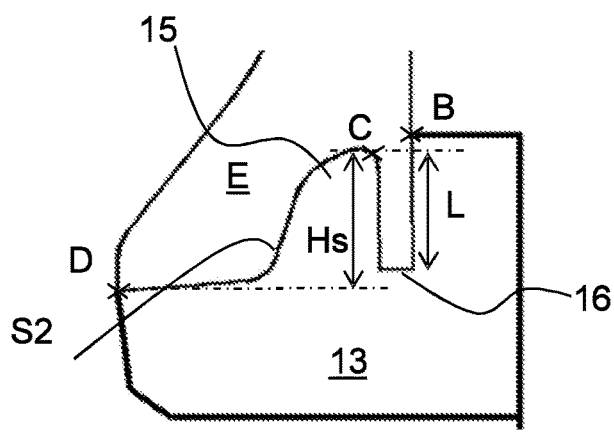
FIG. 4 is an enlarged view of the mould of FIG. 3, centred on the slot.
Figure 5:
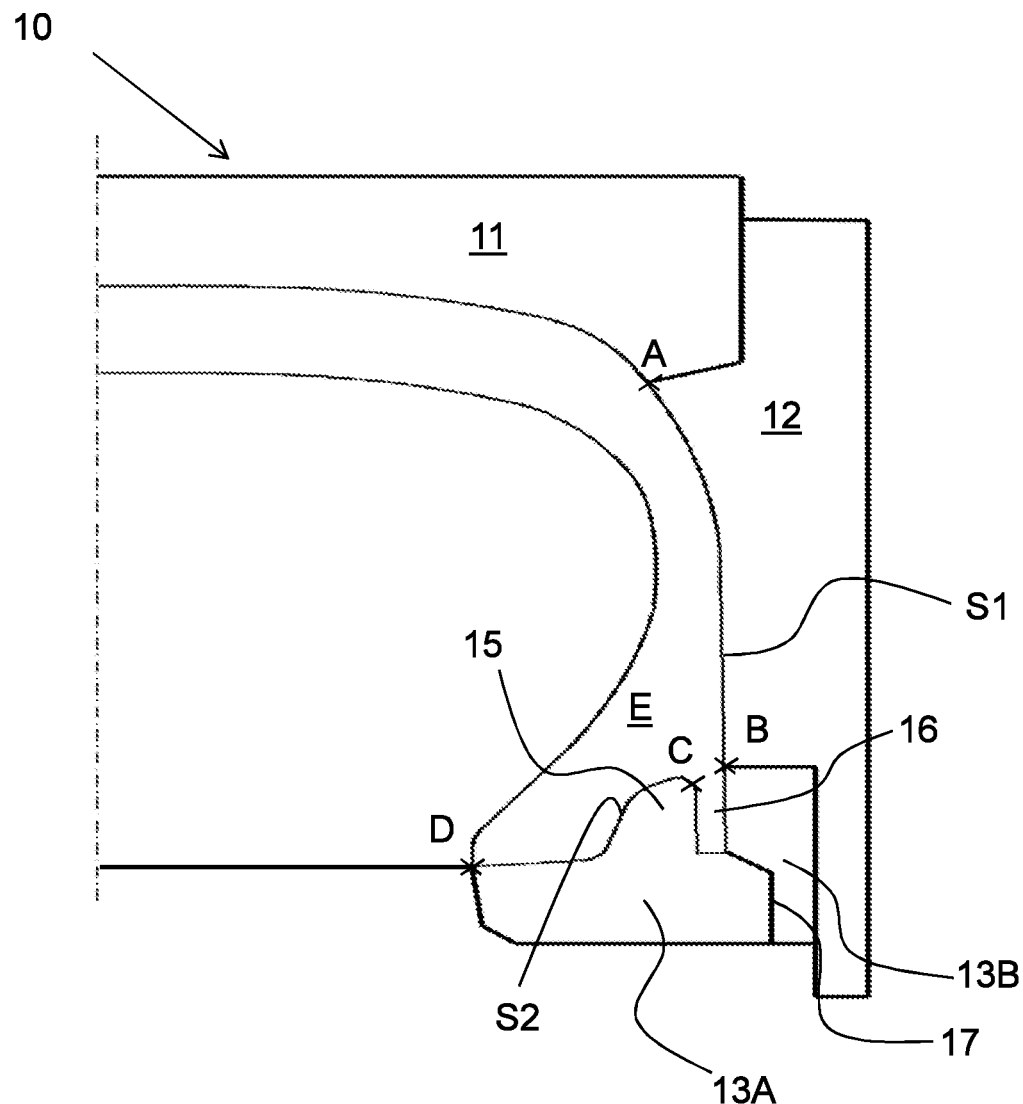
FIG. 5 schematically depicts a cross-sectional view of the mould of the invention according to a third nonlimiting embodiment, in which the slot is delimited by two different mould parts.

In a nonlimiting alternative form of embodiment illustrated in FIG. 3, the angle $\alpha$ of the slot 16 is zero and this slot 16 extends parallel to the radial direction Z.

As has already been specified, the slot 16 has a length L. This length is measured from the intersection between the slot 16 and the moulding surface S1 as far as one end of this slot 16. The slot 16 also has a width W, corresponding to the distance between two opposite walls of this slot. The length L of the slot is determined in such a way that this length is greater than or equal to 5 times the width W. The wall of rubber 25 moulded by the slot 16 maintains the same proportionality between its length and its width. In this way, the wall of rubber 25 possesses greater flexibility. This wall of rubber 25 thus more readily moves closer to the attachment bead under the action of the air flow when the tyre is running.

In a nonlimiting alternative form of embodiment, the width W of the slot is less than or equal to 10 mm. For preference the width W of the slot is less than or equal to 2 mm.

As illustrated in FIGS. 1 to 6, the slot 16 delimits, with the second moulding surface S2, a moulding finger 15. This moulding finger 15 is designed to mould, on the tyre, a rubber-free zone situated behind the wall of rubber 25. This rubber-free zone gives the said wall of rubber 25 flexibility. The moulding finger 15 has a maximum height HS, notably illustrated in FIG. 2 and in FIG. 4. This maximum height HS corresponds to the distance between the point C and the point D of the moulding surface S2, which distance is measured in the radial direction Z. The point C corresponds substantially to the highest point of the moulding surface S2. The point D corresponds substantially to the lowest point of the said moulding surface S2.

In one nonlimiting embodiment, the length of the slot 16 corresponds to at least 90% of the maximum height HS of the moulding finger 15. In this way, the overlapping of the attachment bead 23 by the wall of rubber 25 is optimized. For preference, the length of the slot 16 corresponds to the maximum height HS of the moulding finger 15.

Figure 6:
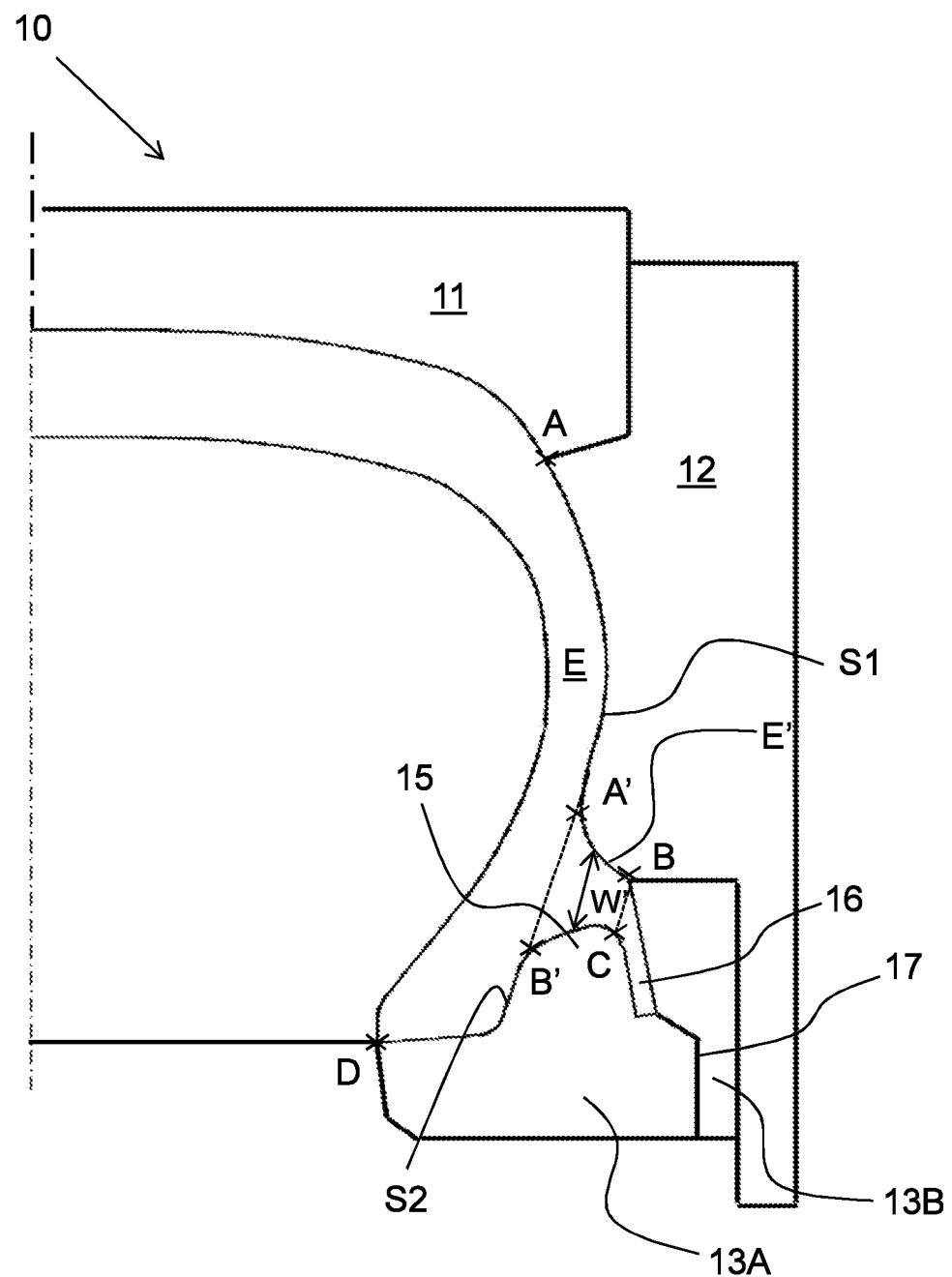
FIG. 6 schematically depicts a cross-sectional view of the mould of the invention according to a sixth nonlimiting embodiment, in which the mould comprises a junction zone joining the slot and the tyre receiving space.

In one nonlimiting embodiment illustrated in FIG. 6, the tyre receiving space E comprises a junction part E'. This junction part E' provides the junction between the slot 16 and the rest of the tyre receiving space E. It is bounded by the points A'-B and B'-C. The junction part E' has a width W' and this width W' decreases progressively from the receiving space E towards the slot 16. The junction part E' thus encourages the rubber that has become more fluid under the effect of the heat during the vulcanizing of the tyre to move. This then improves the filling of the slot 16 with this rubber and the obtaining, on the tyre 20, of a conforming wall of rubber 25.

In one nonlimiting embodiment, the lower part 13 of the mould is in several parts. In one embodiment illustrated in FIG. 6 and in FIG. 7, the lower part 13 of the mould thus comprises a first part 13A and a second part 13B. This first part 13A and this second part 13B delimit the slot 16. The lower part 13 also comprises a transition zone 17 between the first part 13A and the second part 13B. This transition zone 17 begins from the slot 16 at one end C' of the said slot 16. This end C' is opposite to the mould receiving space E. The transition zone 17 opens to the outside of the mould 10. The transition zone 17 therefore constitutes a canal via which some of the air trapped in the mould receiving space E can escape as the rubber arrives in the slot 16. This then makes it easier for the rubber to flow towards the end of the slot 16 as the tyre 20 is being vulcanized. The formation of the wall of rubber 25 is therefore improved as a result.

In one nonlimiting embodiment, the slot 16 is covered with a non-stick coating, such as XYLAN®. The non-stick coating encourages the demoulding of the wall of rubber 25 from the slot 16 once the tyre 20 has been vulcanized.

The invention is not limited to the examples described and depicted and various modifications can be made thereto without departing from its scope.

The invention claimed is:

1. A mold for vulcanizing a tire, the tire comprising a sidewall, an attachment bead extending the sidewall and designed to be attached to a rim of a wheel of a motor vehicle, and a wall of rubber extending circumferentially along the sidewall, the mold comprising a lateral part designed to mold the sidewall of the tire and a lower part designed to mold the attachment bead, the lateral part and the lower part at least partially delimiting a tire receiving space E designed to receive the tire that is to be vulcanized in the mold,
wherein the mold comprises a slot extending the tire receiving space E,
wherein the slot is at least partially delimited by the lower part of the mold,
wherein, viewed in cross-section, the slot makes an angle $\alpha$ less than or equal to 30°, in terms of absolute value, with a radial direction Z of the mold, and
wherein the slot is designed to mold the wall of rubber.

2. The mold according to claim 1, wherein the angle $\alpha$ is less than or equal to 15°.

3. The mold according to claim 1, wherein the slot extends parallel to the radial direction Z.

4. The mold according to claim 1, wherein a length L of the slot is greater than or equal to 5 times a width W of the slot.

5. The mold according to claim 4, wherein the width W of the slot is less than or equal to 10 mm.

6. The mold according to claim 1, wherein the tire receiving space E comprises a junction part E' joining the slot with the rest of the tire receiving space E, a width W' of the junction part E' reducing progressively from the tire receiving space E toward the slot.

7. The mold according to claim 1, wherein the lower part comprises a first part and a second part, and wherein the slot is delimited by the first part and the second part.

8. The mold according to claim 1, wherein the slot is covered with a non-stick coating.

* * * * *